United States Patent [19]

Vaessen

[11] 3,959,502

[45] May 25, 1976

[54] PRESERVATION OF NATURAL INTESTINES

[75] Inventor: Hubert Jacob Vaessen, Deventer, Netherlands

[73] Assignee: H. Vaessen B.V., Deventer, Netherlands

[22] Filed: Mar. 18, 1975

[21] Appl. No.: 559,578

[30] Foreign Application Priority Data

Mar. 21, 1974 United Kingdom............... 12450/74

[52] U.S. Cl.................................. 426/278; 426/140
[51] Int. Cl.²......................................... A22C 13/00
[58] Field of Search ........... 426/140, 321, 332, 442, 426/456, 641, 645, 437, 278

[56] References Cited

UNITED STATES PATENTS

| | | | |
|---|---|---|---|
| 1,484,523 | 2/1924 | Mumm et al. | 426/140 |
| 1,699,076 | 1/1929 | Mumm et al. | 426/140 |
| 2,273,810 | 2/1942 | Adams | 426/140 |
| 2,977,233 | 3/1961 | Vaessen | 426/140 |

*Primary Examiner*—James R. Hoffman
*Attorney, Agent, or Firm*—Browdy and Neimark

[57] ABSTRACT

A process is provided for preserving natural intestines by treating the intestines with a mild alkaline or acidic solution, followed by drying, preferably in stretched condition. The invention also provides the possibility of combining two or more intestines by drying the treated intestines in a position with overlapping edges.

10 Claims, No Drawings

PRESERVATION OF NATURAL INTESTINES

This invention relates to the preservation of natural intestines.

Traditionally, animal intestines to be used as casings are preserved by salting. Usually, the intestines received from the slaughterhouse or the like are first cleaned and thereafter selected or graded according to their width (caliber) and then salted. Thereafter, they are bundled in the salted state to lengths of 100 yards and packed in drums, or wooden tierces, with or without plastic bags. Some more expensive kinds of casings, for example sheep intestines, are stored in smaller quantities in brine solutions in boxes, e.g. of plastic. The salted intestines have to be stored in relatively cool rooms which means that the storing rooms should be provided with cooling machinery, even though this would only have to be used during a part of the year. Finally, they are conveyed to the user, and if they have to be shipped over relatively large distances, this should also be carried out preferably with cooling. The user after receipt of the casings will usually again store them until the actual time of use, and at that time he has to open the drums or tierces, take the tightly packed casings from the salt, soak them in water in order to soften them again and to free them of adhering salt, rinse them with water, and shir them.

This traditional handling process is rather time and labor consuming, especially on the side of the user, whilst, moreover, costs of storage and shipping are rapidly increasing so that the preservation in this way has become a relatively expensive matter for a relatively cheap product. Moreover, the preservation attained with the salt (or brine solution) is only a temporary one so that always the risk is present that casings are lost due to a too high temperature during storage or transportation or due to the fact that they would accidentally be left standing without salt or without sufficient salt for a certain period.

It has now been found that a permanent preservation of the animal intestine material can be obtained by a mild alkali or acid treatment.

According to this invention natural intestines are preserved permanently by treating the intestines with a mild alkaline or acidic solution and drying them, preferably in stretched condition. In this way permanently preserved intestines are obtained.

If desired, an aldehyde, such as a commercial formaline solution, may be added to the treating solution as further preserving agent. However, it should be mentioned that this is not necessary, and that the more aldehyde is added, the more the natural properties of the casings will decrease, because the aldehyde acts as a sort of cross-linking agent for the natural proteins.

According to a preferred embodiment of the invention the alkali or acid treatment is combined with the selecting or grading treatment. In the commercial practice this treatment is carried out by passing a fluid, e.g. air or preferably water, into the intestines which are lying on a calibrating table. The intestines are filled with the fluid and thereby stretched in diameter so that they can be measured. According to a highly advantageous embodiment of this invention a mild acidic or alkaline solution is used as fluid for this treatment. This makes it possible to select the intestines, and at the same time to subject them to the necessary treatment for preservation.

If an alkali treatment is chosen, this can be carried out with solutions of any alkali, such as alkali metal hydroxides, alkali metal carbonates, alkali metal bicarbonates, alkali metal acetates, alkali metal peroxides and other aqueous solutions of alkali metal compounds having a pH in the alkaline field. Ammonia can also be used, but this is not preferred in view of odor problems involved. For commercial purposes one will of course choose a cheap material and according compounds like sodium hydroxide and sodium carbonate are highly useful, and particularly the commercial caustic soda.

If an acid treatment is chosen, one should use a non-oxidizing acid. Examples of suitable acids are hydrochloric acid, lactic acid, tartaric acid, acetic acid and the like.

The temperature of the treatment is not critical, and it is practical to use ambient temperatures, or somewhat higher (30°–50°C).

The treating time is neither very critical, the only requirement being that the treating time is sufficient to obtain the desired preservation. Usually, a time of 10 minutes can already be sufficient, but there is no harm in using longer treating times, although it is recommendable not to exceed times of, say, 24 or 36 hours. Preferably, treating times of ½–4 hours are used and most preferably times of 2.5–3 hours.

If an alkaline solution is used, the strength thereof is usually chosen in such a way that it corresponds to an alkali metal hydroxide (usually NaOH) content of about 0.05 – 5%, although higher concentrations can also be used. If an acidic solution is used, the concentration thereof will vary somewhat with the nature of the acid. Usually the acid concentration will be in the range of 0.01 to 10%.

After the acid or alkali treatment the intestines are dried, preferably in stretched condition. Thus, a practical drying method is to slip the intestines over tubes (i.e. of artificial resin). The intestines are then dried on these tubes, preferably at an elevated temperature, for example at 30°–100°C during several minutes to several hours. In this embodiment it is highly efficient to use tubes provided with perforations through which hot air (or other hot gas) can be blown. The intestines may fit either loosely, or rather tightly around the tubes, the first possibility being preferred. The drying treatment may also be carried out by simply blowing hot air through the intestines.

After the drying treatment the intestines are permanently preserved. This means that they can be stored and shipped or conveyed by other means without any need for cooling. The only thing the user has to do is to subject them to a simple soaking treatment in water in order to soften them again for use.

As is well known, intestine material which has been treated with acid or alkali is sticky before having been dried, and this phenomenon can be utilized in the present process in order to elongate the intestines by sticking two or more of them together. To this end they have only to be slipped over the tubes used for drying with a slight overlap of their edges, and during the drying the overlapping edges are kept well together, either with the aid of some clamping device or else by using tubes on which the intestines fit rather narrowly. In this way it is possible to obtain intestines of any desired length.

EXAMPLE

A treating bath was prepared by dissolving about 4.5 g of caustic soda in 3 $l$ of water. In this bath about 300 g of fresh unsalted pork intestines were soaked for 3 hours. Thereafter, they were struck on tubes and dried. In this way they were permanently preserved.

It will of course be apparent to those skilled in the art that the invention is not limited to the above example which is given for purposes of illustration only. Intestines of other animals can be preserved and other treating bath and drying methods can be used in accordance with the above specification without departing from the scope of the invention.

What we claim is:

1. A process for preserving natural intestines, comprising:
    passing a mild alkaline or acidic solution into the intestines until sufficiently filled and stretched in diameter to be measured; said mild alkaline or acidic solution having a concentration, and remaining in the intestines for a time sufficient, to cause permanent preservation of the intestines;
    selecting or grading the intestines according to their diameter;
    emptying the intestines of said solution; and
    drying the intestines.
2. A process according to claim 1, wherein said solution is an alkaline solution.
3. A process according to claim 2, wherein said solution is selected from the group consisting of alkali metal hydroxides, alkali metal carbonates, alkali metal bicarbonates, alkali metal acetates, and alkali metal peroxides.
4. A process according to claim 3, wherein said solution is a solution of commercial caustic soda.
5. A process in accordance with claim 2 wherein said solution has a concentration selected to give a strength corresponding to that of a 0.05–5% solution of sodium hydroxide.
6. A process according to claim 1, wherein an acidic solution is used.
7. A process according to claim 6, wherein said solution is selected from the group consisting of hydrochloric acid, lactic acid, tartaric acid and acetic acid.
8. A process according to claim 1, wherein said passing step is carried out at a temperature in the range between ambient temperatures and 50°C.
9. A process according to claim 1, wherein the intestines are dried in stretched condition.
10. A process according to claim 9, wherein the intestines are dried in a position with overlapping edges.

* * * * *